United States Patent Office 3,155,720
Patented Nov. 3, 1964

3,155,720
DICHLOROVINYL SULFENYL CHLORIDE
Paul C. Aichenegg, Prairie Village, Kans., and Carl D. Emerson, Kansas City, Mo., assignors to Chemagro Corporation, New York, N.Y., a corporation of New York
No Drawing. Filed Sept. 28, 1961, Ser. No. 143,009
4 Claims. (Cl. 260—543)

The present invention relates to the preparation of novel polyhalovinyl sulfenyl halides.

It has been found that the halogenated vinyl group adjacent to a sulfur atom frequently has valuable properties.

It is an object of the present invention to prepare novel di- halo vinyl (di- haloethenyl) sulfenyl halides wherein the halogen atoms are chlorine and/or bromine.

Another object is to prepare such compounds which can be used as reaction intermediates for attaching polyhalovinylthio (polyhaloethenylthio) groupings to other molecules.

A further object is to prepare novel nematocides, fungicides and bactericides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds of the formula $$\begin{array}{c} R_1 \\ | \\ C=CSX \\ | \ | \\ R_2 \ R_3 \end{array}$$

wherein two of $R_1$, $R_2$ and $R_3$ are chlorine or bromine and the other member of $R_1$, $R_2$ and $R_3$ is hydrogen and X is chlorine or bromine. Preferably, X is chlorine. The preferred compounds are 1,2-dichlorovinyl sulfenyl chloride and 2,2-dichlorovinyl sulfenyl chloride.

Other compounds within the present invention are 1,2-dibromovinyl sulfenyl chloride, 2,2-dibromovinyl sulfenyl chloride, 1-chloro-2-bromovinyl sulfenyl chloride, 1-bromo-2-chlorovinyl sulfenyl chloride, 1,2-dibromovinyl sulfenyl bromide, 2,2-dibromovinyl sulfenyl bromide, 1,2-dichlorovinyl sulfenyl bromide, 2,2-dichlorovinyl sulfenyl bromide, and 1-bromo-2-chlorovinyl sulfenyl bromide.

The compounds of the present invention can be prepared by reacting the appropriate di- halovinyl disulfide with chlorine or bromine. The reaction is conveniently carried out, for example, by adding equimolar amounts of chlorine or bromine to the parent disulfide used as starting material at −20° C. up to +30° with exclusion of moisture. It is not essential to employ a solvent but if desired solvents such as chloroform and carbon tetrachloride can be employed. The sulfenyl chlorides formed are readily purified by distillation at slightly elevated temperatures under reduced pressures.

Typical examples of disulfides suitable for use as starting materials are 1,2-dichlorovinyl disulfide, 2,2-dichlorovinyl disulfide, 1,2-dibromovinyl disulfide, 2,2-dibromovinyl disulfide, 1-chloro-2-bromovinyl disulfide, 1-bromo-2-chlorovinyl disulfide.

The starting disulfides are made as disclosed in Aichenegg application Serial No. 127,497, filed July 28, 1961, now Patent No. 3,109,032.

The sulfenyl chlorides and bromides of the present invention are useful as nematocides, fungicides and bactericides. 2,2-dichlorovinyl sulfenyl chloride when placed in a desiccator together with soil infested with Panagrellus and Rhabditis spp. destroyed the nematodes and also was effective as a fungicide with soil infected with Pythium spp. and against pathogenic soil bacteria. The compounds of the present invention are also useful as intermediates for the manufacture of synthetic resins, dyes, pharmaceuticals and warfare agents.

They are useful intermediates for the introduction of polychlorovinylthio or polybromovinylthio groupings into other organic moieties. Thus, by reacting the compounds of the present invention with an equimolecular amount of a mercaptan having the formula RSH in the presence or absence of an inert diluent such as chloroform or carbon tetrachloride at or below room temperature during periods ranging from 10–20 minutes to 2–3 hours according to the equation $$\text{RSH} + \text{ClSC}=\underset{\underset{R_2}{|}}{\underset{|}{C}}\underset{R_1}{\overset{R_1}{|}} \rightarrow \text{RSSC}=C\underset{R_2}{\overset{R_1}{\diagup}} + \text{HCl}$$

there are formed mixed disulfides where R is hydrocarbon or haloaryl and two of $R_1$, $R_2$ and $R_3$ are chlorine or bromine and the remaining member of $R_1$, $R_2$ and $R_3$ is hydrogen.

The compounds thus formed showed nematocide activity against Panagrellus and Rhabditis spp. n-Butyl 1,2-dichlorovinyl disulfide and n-butyl 2,2-dichlorovinyl disulfide showed good nematocide activity as did phenyl 1,2-dichlorovinyl disulfide.

Branched chain alkyl-dichlorovinyl disulfides appear to possess considerably weaker nematocidal activities such as isopropyl-2,2-dichlorovinyl disulfide which has weak and tertiary butyl 2,2-dichlorovinyl disulfide which has practically no nematocidal properties.

Other compounds which are included within the above set forth generic formula for the mixed disulfides and which can be formed by the reaction of compounds of the present invention with mercaptans are methyl 1,2-dichlorovinyl disulfide, methyl 2,2-dichlorovinyl disulfide, ethyl 1,2-dichlorovinyl disulfide, ethyl 2,2-dichlorovinyl disulfide, N-butyl 1,2-dibromovinyl disulfide, n-butyl 2,2-dibromovinyl disulfide, n-butyl 1-chloro-2-bromovinyl disulfide, amyl 1,2-dichlorovinyl disulfide, amyl 2,2-dichlorovinyl disulfide, n-hexyl 1,2-dichlorovinyl disulfide, n-hexyl 2,2-dichlorovinyl disulfide, cyclohexyl 1,2-dichlorovinyl disulfide, cyclohexyl 2,2-dichlorovinyl disulfide, n-octyl 1,2-dichlorovinyl disulfide, 2-ethylhexyl 2,2-dichlorovinyl disulfide, dodecyl 1,2-dichlorovinyl disulfide, tetradecyl 2,2-dichlorovinyl disulfide, p-tolyl 1,2-dichlorovinyl disulfide, o-tolyl 2,2-dichlorovinyl sulfide, benzyl 1,2-dichlorovinyl disulfide, benzyl 2,2-dichlorovinyl disulfide, p-chlorophenyl 1,2-dichlorovinyl disulfide, p-chlorophenyl 2,2-dichlorovinyl disulfide, and m-bromophenyl 1,2-dichlorovinyl disulfide.

Unless otherwise indicated, all parts and percentages are by weight.

EXAMPLE 1

*1,2-Dichlorovinyl Sulfenyl Chloride*

$$(\text{CHCl}=\text{CCl})_2\text{S}_2 + \text{Cl}_2 \rightarrow 2\text{CHCl}=\text{CClSCl}$$

Into 74.1 grams of crude 1,2-dichlorovinyl disulfide containing 80% pure material (or 0.232 mole), previously cooled to −15° C. to −20° C., 17 grams (0.239 mole, a 3% excess) of chlorine gas were directly introduced with vigorous agitation. When the desired weight increase was reached, the crude reaction mixture was allowed to attain room temperature. Vacuum distillation furnished 48.2 grams (63.5% of theory) yield of pure 1,2-dichlorovinyl sulfenyl chloride as a red liquid of characteristic odor. B.P.$_{.5.5}$ 41° C., $n_D^{25}$ 1.5713, $d_{20}^{20}$ 1.583, Cl 64.5% (theory 64.7%), S 20.3% (theory 19.6%). The infrared spectrum in comparison with that of 1,2-dichlorovinyl disulfide used as a starting material showed considerable similarity. Some differences in the 740–840 CM$^{-1}$ region were noted, however. The peak at 812 CM$^{-1}$ of the disulfide shifted to 822 CM$^{-1}$ in the sulfenyl chloride and that at 790 CM$^{-1}$ of the disulfide became considerably broader in the sulfenyl chloride. Additionally the peak at 1220 CM$^{-1}$ decreased and broadened noticeably in the sulfenyl chloride.

EXAMPLE 2

2,2-Dichlorovinyl Sulfenyl Chloride $$(CCl_2=CH)_2S_2 + Cl_2 \rightarrow 2CCl_2=CHSCl$$

162.3 grams (0.635 mole) of 2,2-dichlorovinyl disulfide were diluted with one volume of carbon tetrachloride and cooled to $-20°$ C. 44.7 grams (0.63 mole) of chlorine gas were then introduced with stirring, maintaining a reaction temperature of $-20$ to $-15°$ C. The reaction mixture was allowed to warm to room temperature, the solvent stripped off and vacuum distillation employed to give 98.4 grams (48.2% of theory) yield of 2,2-dichlorovinyl sulfenyl chloride as a dark red liquid of characteristic odor. B.P.$_{15-20}$ 44–6° C., $n_D^{25}$ 1.5728, $d_{20}^{20}$ 1.580, Cl 64.1% (theory 64.7%), S 19.2% (theory 19.6%).

The infrared absorption spectrum showed similar relationships to that of the parent disulfide used as starting material as described in Example 1. There are only very slight differences in the 740–840 CM$^{-1}$ region as compared to the spectrum of 1,2-dichlorovinyl sulfenyl chloride which is almost identical with reference to the remaining absorptions.

EXAMPLE 3

2,2-Dibromovinyl Sulfenyl Chloride

The procedure of Example 2 is repeated replacing the 2,2-dichlorovinyl disulfide by 0.1 mole of 2,2-dibromovinyl disulfide to obtain 2,2-dibromovinyl sulfenyl chloride as the product after removal of the carbon tetrachloride by distillation.

The stability of the compounds of the present invention was determined by measuring the change of concentration of the SCl function in tests run at 0° C. and 25–27° C.

The percent SCl content was determined as follows:

A known weight of sample was placed in a flask, evacuated for 2 to 3 minutes at room temperature and 60 to 70 mm. Hg in order to remove free HCl. Then a 1 N solution of n-butyl mercaptan in benzene was added. After standing at room temperature for approximately two hours the formed HCl was extracted into water and determined by titration with base. The other product of reaction in addition to HCl was n-butyl 1,2-dichlorovinyl disulfide (when the 1,2-dichlorovinyl sulfenyl chloride was tested), and n-butyl 2,2-dichlorovinyl disulfide (when the 2,2-dichlorovinyl sulfenyl chloride was tested). The results of the stability test are shown in the following table.

| Sulfenyl Chloride Compound | Percent Loss RSCl at 25–27° C. | | Percent Loss RSCl at 0° C. | |
|---|---|---|---|---|
| | 20 Hours | 76.5 hours | 20 hours | 76.5 hours |
| 1,2-dichlorovinyl | 20 | 42.6 | 0 | 13.4 |
| 2,2-dichlorovinyl | 21.5 | 40.0 | 1 | 36.9 |

We claim:
1. Compounds of the formula

wherein two of $R_1$, $R_2$ and $R_3$ are selected from the group consisting of chlorine and bromine and the remaining member of $R_1$, $R_2$ and $R_3$ is hydrogen, and X is chlorine.
2. Dichlorovinyl sulfenyl chloride.
3. 2,2-dichlorovinyl sulfenyl chloride.
4. 1,2-dichlorovinyl sulfenyl chloride.

References Cited by the Examiner

UNITED STATES PATENTS

| | | | |
|---|---|---|---|
| 2,796,437 | 6/57 | Park | 260—543 |
| 2,853,516 | 9/58 | Louthan | 260—543 |
| 3,019,258 | 1/62 | Hauptschein | 260—543 |

OTHER REFERENCES

Kharasch et al.: "Chem. Reviews," vol. 39 (1946), pp. 283–285.

Brintzinger et al.: "Ber. Deut. Chem.," vol. 83, pp. 87–90 (1950).

Derwent Belgian Report No. 74′B′ (1961), p. A20, Belgian Patent 596,392 (7 pages).

LEON ZITVER, Primary Examiner.

CHARLES B. PARKER, Examiner.